July 23, 1968   T. F. HILLMAN ET AL   3,393,495
LOADING APPARATUS

Filed March 10, 1967   8 Sheets-Sheet 1

INVENTORS.
THOMAS F. HILLMAN
HARRIS G. RODGERS
BY
Charles W. Gregg
AGENT

Fig. 4

INVENTORS.
THOMAS F. HILLMAN
HARRIS G. RODGERS
BY
Charles W. Gregg
AGENT

INVENTORS.
THOMAS F. HILLMAN
HARRIS G. RODGERS
BY
Charles W. Gregg
AGENT

INVENTORS.
THOMAS F. HILLMAN
HARRIS G. RODGERS
BY
Charles W. Gregg
AGENT

United States Patent Office 3,393,495
Patented July 23, 1968

3,393,495
LOADING APPARATUS
Thomas F. Hillman and Harris G. Rodgers, Corning,
N.Y., assignors to Corning Glass Works, Corning,
N.Y., a corporation of New York
Filed Mar. 10, 1967, Ser. No. 622,158
13 Claims. (Cl. 53—246)

ABSTRACT OF THE DISCLOSURE

Apparatus for successively transferring a succession of similar flat, or hollow domed articles to a sheet of packaging material having rows of bosses arranged in columns, the spaces between rows of bosses corresponding to the rims of said succession of articles, the rim of each succeeding article being inserted in spaces following the spaces containing the rim of each preceding article. Apparatus motion transfers flat articles with flat surfaces thereof ending in close proximity, and transfers domed articles with the external surface of dome of each succeeding article ending nested within hollow of dome of preceding article.

Background of the invention

The invention relates to apparatus for precisely loading or inserting a succession of similar flat or hollow domed articles into a sheet of flexible material for packaging such articles.

There is disclosed, for example, in copending application Ser. No. 301,562, filed Aug. 12, 1963, and assigned to the same assignee as the present application, a package employing a sheet of flexible packaging material similar to that with which the apparatus of the present invention is to be employed. Apparatus for loading a succession of hollow domed articles into a sheet of such packing material has heretofore been built. Such apparatus comprises an intermittently advanced conveyor for moving said sheet of material in incremental steps for receipt of succeeding ones of said articles, an intermittently rotated table delivering each of said articles to a transfer station, and a transfer mechanism embodying a vacuum chuck for lifting each said article delivered to said transfer station and transferring such article to a delivery station where it is received by a tilting chute apparatus for loading into said sheet of packaging material. Most of said items of apparatus are well known as discussed hereinafter. However, the tilting chute apparatus is new insofar as is known, but does not operate completely satisfactorily under all conditions. For example, when it is desired or necessary for said articles to be loaded in said packaging material with a preselected rotational orientation of the articles it has been found that such articles, although they were deposited on said chute with the desired rotational orientation therefore for loading into said packaging material, tend to rotate when sliding down said chute during tilting thereof. Furthermore, said chute does not provide positive loading of said articles in said packaging material to a degree considered desirable for such loading. Accordingly, new means for loading said articles in said packaging material were sought, thereby resulting in the apparatus of the present invention and including modifications controlling the intermittent movement of said conveyor during loading of a succession of said articles in a sheet of said packaging material.

Summary of the invention

In practicing the present invention there is provided in the place of the above mentioned tilting chute a rocker arm keyed to a horizontal rockshaft and normally extending upward therefrom, the end of such rocker arm supporting a normally horizontally disposed article-receiving platform including a plurality of movable fingers for holding on such platform each article transferred thereto. Said rockshaft and rocker arm are actuated so as to oscillatorily move said platform in a vertical arc of travel extending between its normal horizontal position and a vertical package-loading position where each said article is firmly loaded into a sheet of packaging material carried by a conveyor, said platform also being simultaneously moved in lateral directions corresponding to each respective direction of oscillatory movement of the platform.

Brief description of the drawings

FIGS. 14 and 15 are schematic electrical circuit diagrams illustrating electrical controls actuated by the article detecting apparatus of FIG. 9.

Similar reference characters refer to similar parts in each of the figures of the drawings.

Description of the preferred embodiment

Figure 1:
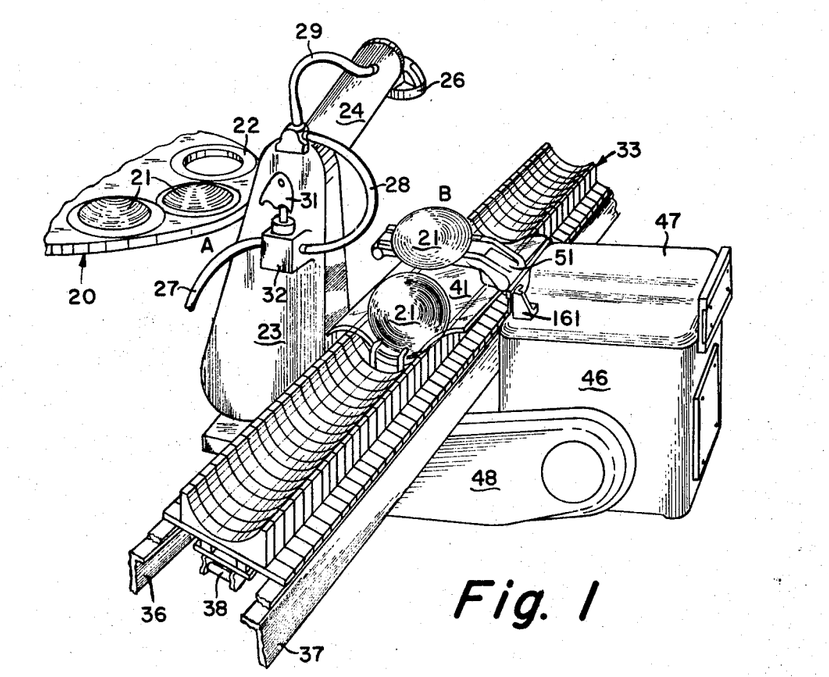
FIG. 1 of the drawings is a perspective view of the general layout of the loading apparatus embodying the invention.

The general arrangement of the apparatus of the invention employed with the prior art apparatus is shown in FIG. 1 of the drawings. Such prior art apparatus comprises a rotatable table or platform 20 which is intermittently rotated by motor means (not shown) to periodically deliver each of a succession of articles, such as sealed beam headlight lenses 21, to a transfer station indicated at A. The articles such as 21 may be automatically or manually supplied to suitable article supports such as 22 equally spaced apart adjacent the outer periphery of platform 20. An article transfer mechanism 23 supporting an article transfer arm 24 is located adjacent said transfer station A. The upper end of transfer arm 24 carries a vacuum chuck 26 to which is periodically supplied through conduits 27, 28 and 29 vacuum or negative pressure. Arm 24 is periodically oscillated through a vertical arc of travel of approximately 180° and extending between said station A and an article delivery station indicated at B. Delivery station B will be further discussed hereinafter in the description.

Transfer mechanism 23 and arm 24, and thereby vacuum chuck 26, are actuated through said 180° arc of travel in synchronism with the periodic delivery of each article, such as lens 21, to delivery station A by platform 20 so that vacuum chuck 26 contacts the top surface of each such lens delivered to said station A and transfers it to said station B. A cam 31 on transfer mechanism 23 is moved in synchronism with transfer arm 24 so as to periodically actuate a vacuum control valve 32 to supply vacuum through conduits 28 and 29 to chuck 26 following its said contacting of the top surface of an article such as lens 21 on platform 20.

Such vacuum supplied to said chuck 26 is then maintained thereto during transfer of each said lens to delivery station B, said supply of vacuum being terminated to release each respectively transferred lens following the transfer thereof to such delivery station.

A section of a conveyor 33 is also shown in FIG. 1, such conveyor extending in an endless loop in the manner well known in the art but not shown in the drawing for purposes of simplification thereof. As shown in FIG. 1, conveyor 33 rides on rails 36 and 37 and is moved along said rails by a conveyor chain 38 in a manner hereinafter discussed in more detail. However, it is pointed out at this time that conveyor 33 is intermittently moved in the left hand direction (viewing FIG. 1) in synchronism with the actuation of the apparatus previously discussed. As mentioned, such operation of conveyor 33 will be further discussed hereinafter.

Figure 2:
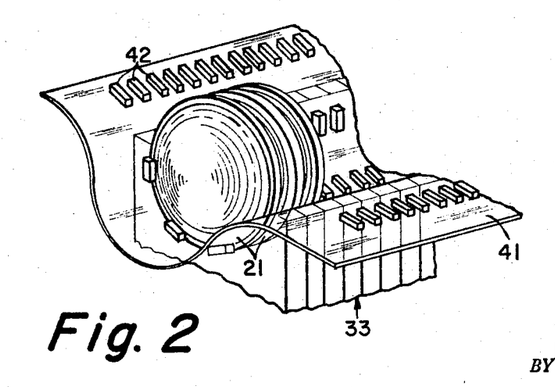
FIG. 2 is a detail perspective fragmentary view illustrating the manner in which the apparatus of FIG. 1 loads articles into a sheet of packaging material.

There is shown in FIGS. 1 and 2 a sheet of flexible packaging material such as 41 provided with a plurality of rows of upstanding bosses 42 (FIG. 2) which are also arranged in columns on such sheet. The spaces between said rows of bosses 42 correspond to the thickness of the edges of the lenses such as 21 or other similar articles to be loaded into said sheet of packaging material, and such edges are firmly inserted by the apparatus of the present invention into said spaces as illustrated in FIG. 2 and as discussed hereinafter in detail. As previously mentioned the sheets of packaging material such as 41 comprise, per se, no part of the present invention and, if further details of such sheets of packaging material are desired, reference may be had to the previously mentioned copending application Ser. No. 301,562. It is pointed out at this time, however, that each sheet of packaging material, such as 41, which is to be loaded with a succession of articles, such as 21, is disposed on said conveyor 33 in the manner illustrated in FIG. 1 of the drawings, that is, so that a part of each respective sheet curves to fit into the curved upper surface of the conveyor 33.

The apparatuses so far discussed in this description, as well as the sheets of packaging material such as 41 as previously mentioned, in themselves form no part of the present invention but are part of the prior art with which the present invention is employed. Each of said apparatuses are well known components of the prior art.

Referring further to FIG. 1 of the drawings, there is shown a housing 46 which encloses the major part of the apparatus of the present invention and includes a removable top 47. A second housing 48 extends on one side of housing 46 and encloses a chain drive arrangement hereinafter further discussed. There also extends out of housing 46 at one end thereof a rockshaft (not shown in FIG. 1) upon which is mounted one side of a rocker arm 51 which carries, on its otherwise free end, a platform for receipt of each of a succession of lenses transferred to the previously mentioned delivery station B. Such platform also does not appear in FIG. 1 but, along with said rockshaft, is shown in other figures of the drawings discussed hereinafter.

Figure 3:
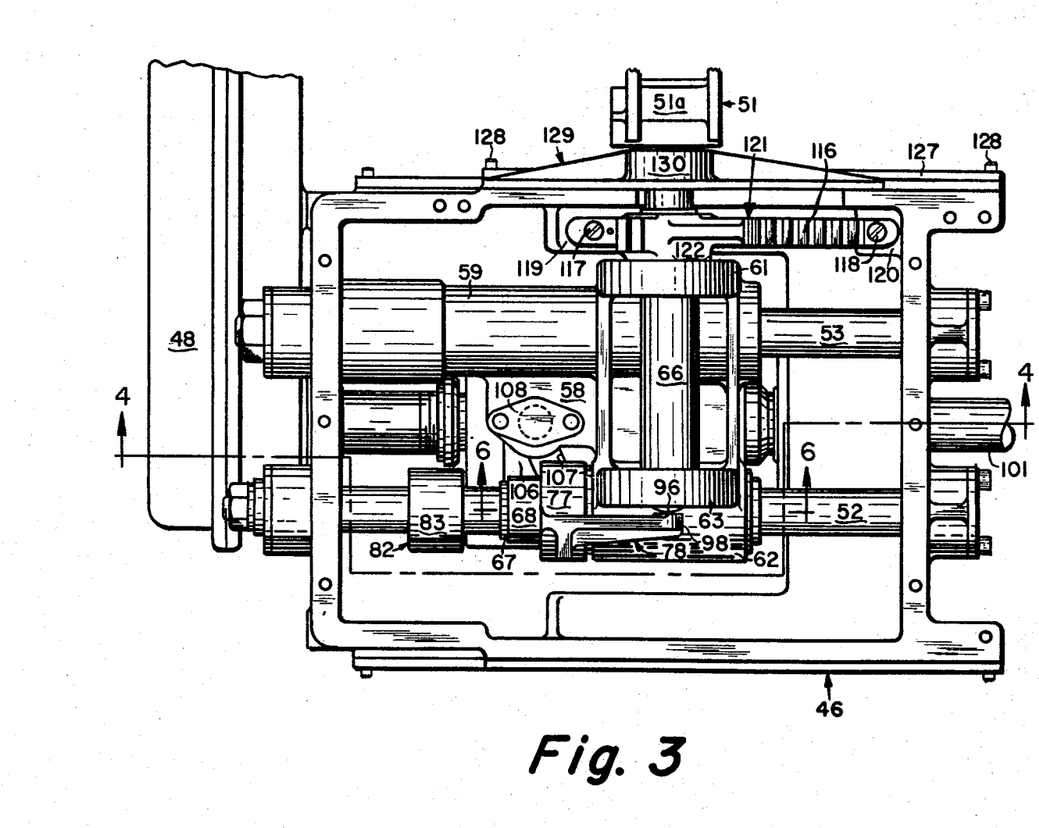
FIG. 3 is a top plan view of a part of the apparatus embodying the invention.
Figure 4:
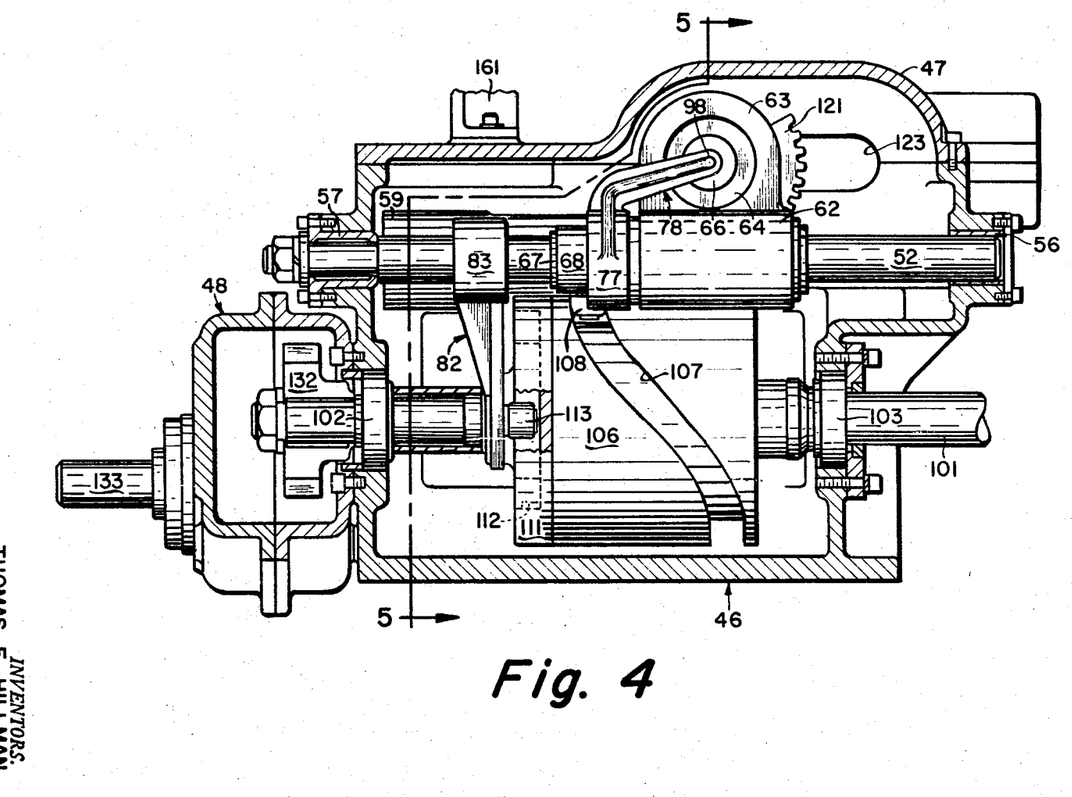
FIG. 4 is a side view of the apparatus of FIG. 3 and partially in cross section, such view being taken substantially on line 4—4 of FIG. 3.
Figure 5:
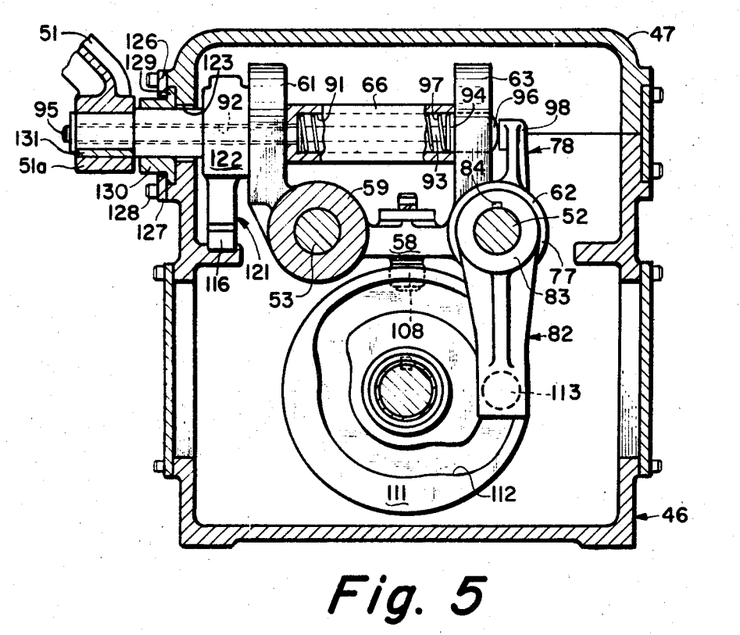
FIG. 5 is a view similar to FIG. 4 and taken substantially on line 5—5 of FIG. 4.

With reference to FIGS. 3, 4 and 5 of the drawings, the details of the apparatus enclosed in previously mentioned housing 46 will be discussed. It is pointed out that FIG. 3 comprises a top view of housing 46 with the top 47 thereof removed and, therefore, shows a top plan view of the apparatus housed in housing 46.

There is shown in FIGS. 3, 4 and 5 a pair of circular elongated shafts 52 and 53 whose ends are mounted in opposite ends of housing 46. The ends of shaft 52 are mounted in said ends in suitable bearings 56 and 57 (FIG. 3) which support such shaft for at least partial rotation thereof. The ends of shaft 53 are affixed in said opposite ends of housing 46 since no rotation of such shaft is necessary.

There is supported by and upon shafts 52 and 53 a member 58 including a sleeve portion 59 surrounding shaft 53 and slidably movable along a part of the length of such shaft. Member 58 also includes a sleeve portion 62 surrounding shaft 52 and discussed in detail hereinafter in conjunction with FIG. 6 of the drawings. Member 58 also includes portions 61 and 63 which extend upright from said sleeve portions 59 and 62, respectively, of member 58. Portion 63 of member 58 supports a suitable rotary bearing 64 through which extends the previously mentioned rockshaft indicated by reference character 66. Portion 61 of member 58 supports a bearing similar to bearing 64 and through which rockshaft 66 also extends. By such arrangement it is apparent that rockshaft 66 is, for purposes hereinafter discussed, rotatably supported within said upright portions 61 and 63 of member 58. Rockshaft 66 will be further discussed hereinafter.

Figure 6:
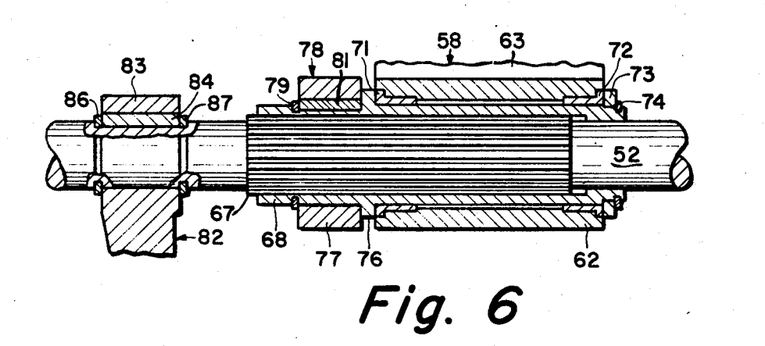
FIG. 6 is a cross-sectional view of part of the apparatus of FIG. 3 and taken on line 6—6 of FIG. 3.

Referring to FIG. 6 of the drawings, shaft 52 includes an intermediate portion 67 of a larger diameter than the remainder of the shaft, such enlarged portion being grooved along the length thereof to provide a spline shaft portion on parent shaft 52. A sleeve 68 having internal grooves corresponding with those on said portion 67 of shaft 52 surrounds such portion 67, and is longitudinally slidable therealong but is keyed by said grooves so that it rotates with any rotation of shaft 52. The ends of previously mentioned sleeve portion 62 of member 58 is provided with suitable bearings 71 and 72 through which sleeve 68 extends and, thus, shaft 52 and sleeve 68 are rotatable within sleeve portion 62 of member 58. Bearing 72 is retained in the right hand end (viewing FIG. 6) of sleeve portion 62 by a washer 73 surrounding sleeve 68 and held against bearing 72 by a split ring 74 disposed in a cooperating channel extending around the corresponding end of sleeve 68. Bearing 71 is retained in the other or left hand end of sleeve portion 62 of member 58 by an enlarged flange portion 76 on sleeve 68 and held against such bearing by a hub portion 77 of a curved rocker arm member 78, such hub portion also surrounding sleeve 68 and held thereon by a split ring 79 disposed in a cooperating channel surrounding said sleeve. A key 81 is disposed in a channel in the inner periphery of said hub portion 71 and a corresponding channel in a corresponding portion of the outer periphery of sleeve 68 to key said parts to each other. The hub portion 83 of another rocker arm member 82 surrounds shaft 52 near the left hand end (viewing FIG. 6) of such shaft and is keyed for rotation with such shaft by a key 84 provided in cooperating channels in the inner periphery of hub portion 83 and the outer periphery of shaft 52. Member 82 is held against longitudinal movement on shaft 52 by split rings 86 and 87 disposed in cooperating channels provided in the outer periphery of shaft 52.

By the arrangement just discussed it is apparent that member 58, sleeve 68 and the apparatus surrounding such sleeve are all slidably movable together along a portion of shaft 52 while any rotation of shaft 52 will impart a similar rotation to sleeve 68 because of the splines between such sleeve and intermediate portion 67 of shaft 52. Similarly any such rotation of sleeve 68 will impart a similar rotation to hub portion 77 of rocker arm member 78 because of such hub portion being keyed by key 81 to sleeve 68. It is also pointed out that rotation of hub portion 83 of rocker arm member 82 will cause a corresponding rotation of shaft 52 since such parts are keyed to each other by key 84.

Previously mentioned rockshaft 66, as shown in FIG. 5 of the drawings, embodies a large cylindrical cavity 91 extending longitudinally through the center of the right hand portion of the rockshaft (when viewing FIG. 5) and a smaller cylindrical cavity 92 extending longitudinally through the center of the left hand portion of the rockshaft, such cavities connecting with each other at approximately the center of the rockshaft intermediate the ends thereof. A slender rod or shaft 93 having an enlarged end portion 94 on the right hand end thereof extends through said cavities with the extreme left hand and right hand ends 95 and 96, respectively, thereof extending out of the corresponding ends of rockshaft 66. A compressible coil spring 97 surrounds that portion of rod 93 which extends through cavity 91 in rockshaft 66, the left hand end of such spring bearing against the end of cavity 91 where it joins the corresponding end of cavity 92. The right hand end of spring 97 bears against said enlarged end portion 94 of rod 93. The end 96 of rod 93 which extends out of the right hand end of rockshaft 66 bears against a face of a bumper portion 93 on the upper end of rocker arm member 78 and rod 93 is actuated in the left hand direction against the pressure of spring 97 to compress such spring between the enlarged end portion 94 of rod 93 and the left hand end of cavity 91 whenever bumper portion 98 of rocker arm member 78 is, as shown in FIG. 5, actuated against said end 96 of rod 93. At such time, end 95 of rod 93 is forced a short distance out of the left hand end of cavity 92 in rockshaft 66 as also illustrated in FIG. 5 and in FIG. 8. The manner in which bumper portion 98 of rocker arm member 78 is actuated against end 96 of rod 93 and the purpose for such actuation will be further discussed hereinafter. It is, however, pointed out at this point in the description that end 95 of rod 93 will again be partially retracted within cavity 92 by spring 97 when end 96 of said rod is no longer contacted by bumper portion 98 of rocker arm member 78.

Referring further to FIGS. 3, 4 and 5 of the drawings, a drive shaft 101 extends through suitable rotary bearings 102 and 103 provided in the left hand and right hand ends, respectively, of housing 46 (when viewing FIG. 4). A cylindrical drum cam 106 is mounted on shaft 101 in any suitable manner for driven rotation with said drive shaft. There is provided in the outer peripheral wall of cam 106 a channel of groove 107 which extends spirally about half of such outer periphery from a first end of the drum towards the second end thereof as shown in FIG. 4 and then extends spirally about the back half (viewing FIG. 4) of such other periphery from said second end of drum 106 towards said first end thereof. A cam follower 108 (FIGS. 4 and 5) is pivotally mounted on previously mentioned member 58 such cam extending below the bottom surface of such member and into said channel or groove 107 in the outer peripheral wall of cam 106. It will thus be readily apparent to those skilled in the art that, during rotation of cam 106 by drive shaft 101, cam follower 108 will follow groove or channel 107 in cam 106 and move member 58 and its associated parts reciprocatively along shafts 52 and 53, between the left hand position of such member, as shown in FIG. 4, and a right hand position defined by the distance said groove or channel 107 extends along the length of cam 106. This will be further discussed in conjunction with FIG. 13 of the drawings.

There is mounted on the left hand end of cam 106 and secured thereto for rotation therewith a face cam 111 having a groove or channel 112 provided in the exposed face of the cam. Such groove or channel 112 is provided in such face of the cam in the pattern illustrated in FIG. 5. A cam follower 113 is, as best illustrated in FIG. 4, pivotally mounted on the lower end of previously mentioned rocker arm member 82 and extends into said groove or channel 112 in the said face of cam 111. During rotation of cam 111 with cam 106 and drive shaft 101, cam follower 113 will follow groove or channel 112 in cam 111 and reciprocatively rock rocker arm member 82 to thereby cause rotational rocking movement of shaft 52. Such rocking movement of shaft 52 causes, in turn, reciprocative rocking movement of bumper portion 98 of rocker arm member 78 and previously mentioned rod 93 is, thereby, actuated in cavities 91 and 92 of rockshaft 66 in the manner previously discussed and as discussed further hereinafter.

There is also shown in FIGS. 3, 4 and 5 of the drawings a rack and pinion gear arrangement including a rack 116 which is immovably affixed to housing 46 by screws 117 and 118 screwed into suitable support portions 119 and 120 of said housing 46. The pinion gear 121 which has gear teeth cooperatively meshing with the teeth of rack 116 is shown as comprising a somewhat greater than a 90° segment of a full pinion gear. Pinion gear 121 also includes the usual hub portion 122 which surrounds rockshaft 66 and is secured, in any convenient manner, to the outer periphery of such rockshaft for rotation therewith.

Viewing FIG. 5, the left-hand end of rockshaft 66 extends through a horizontally longitudinal slot 123 provided in the side of housing 46. On the outer wall of such side of housing 46 there is provided, above and below said slot, upper and lower longitudinal guide members 126 and 127, respectively, such members being secured to said wall by bolts such as 128 and providing a slideway for a sliding member 129 which covers said slot 123. Slide member 129 includes a center bearing portion 130 through which rockshaft 66 snugly but rotatably extends. End 51a of previously mentioned rocker arm 51 surrounds the left-hand end of rockshaft 66 and is keyed thereto for rotational movement therewith by a key 131 disposed in cooperative channels provided in the outer periphery of rockshaft 66 and portion 51a of rocker arm 51 surrounding such rockshaft. A split ring 132 (FIG. 8) is disposed in a cooperating channel surrounding the outer periphery of the left hand end of rockshaft 66 to prevent longitudinal movement of hub portion 51a of rocker arm 51 along rockshaft 66.

Viewing FIG. 4, the extreme left hand end of drive shaft 101 is provided with a chain sprocket 132 which is secured, in any convenient manner, to such end of drive shaft 101 for rotational movement therewith. Chain sprocket 132 operates a chain drive which is enclosed in housing 48 (FIG. 1) and imparts rotary motion to an output drive shaft 133 (FIG. 4) which is located below conveyor 33 shown in FIG. 1. Output shaft 133 is, in turn, connected through a suitable gear box to an apparatus for intermittently driving conveyor 33 as previously discussed. Such apparatus, per se, forms no part of the present invention but will be briefly discussed further hereinafter in an operational example of the invention.

Figure 7:
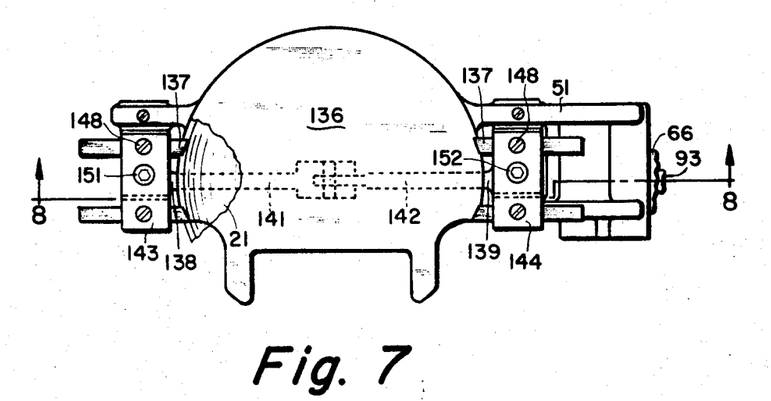
FIG. 7 is a detailed top plan view of the article loading platform forming part of the invention.
Figure 8:
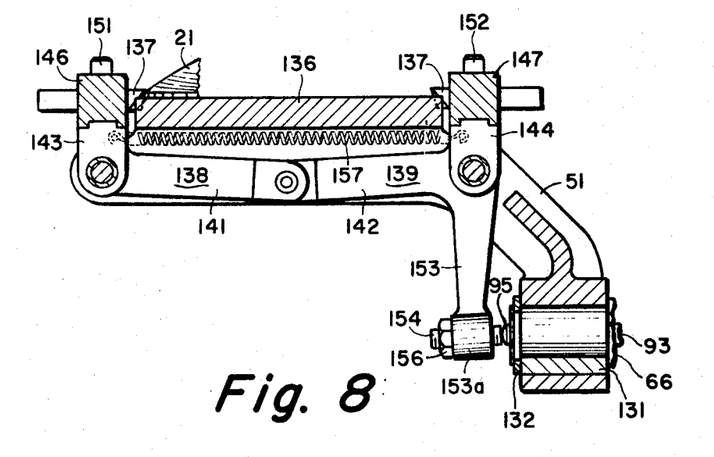
FIG. 8 is a side view of the apparatus of FIG. 7, such view being partially in cross-section and being taken substantially on line 8—8 of FIG. 7, FIG. 9 comprises a side elevational view of article detecting apparatus employed in conjunction with the invention, FIG. 10 comprises an end elevational view of the apparatus of FIG. 9, such view being taken on line 10—10 of FIG. 9, FIGS. 11 and 12 comprise schematic views illustrating motion of the loading apparatus embodying the invention, FIG. 13 comprises a chart illustrating the sequence of movement of certain parts of the apparatus of the invention.

As illustrated in FIGS. 7 and 8, taken in conjunction with FIGS. 3 and 5, rocker arm 51 which has its one end, as previously discussed, secured to the end of rockshaft 66, carries on its other end a platform 136 to and upon whose top surface are transferred and deposited the articles or lenses such as 21 when such rocker arm is in the position shown in FIG. 8. Just immediately following the movement of rockshaft 66 to actuate rocker arm 51 to the position shown in FIG. 8 and the receipt on platform 136 of a lens such as 21, a plurality of fingers such as 137 are actuated to move over the rim of the lens and hold such lens on platform 136 during its transfer to a packaging-sheet loading position as previously mentioned and as hereinafter further discussed. The manner in which fingers such as 137 hold a lens on platform 136 is illustrated at the left hand portion of FIG. 7 and the left and right hand portions of FIG. 8.

There is pivotally mounted on the upper end of rocker arm 51, at the left and right hand ends of such upper end, first and second crank members 138 and 139, respectively. Such members have crank arms 141 and 142, respectively, which extend toward each other below platform 136 and are pivotally connected to each other where they meet below the center of said platform. Crank members 138 and 139 further include upwardly extending finger support portions 143 and 144, respectively, having cap members 146 and 147, respectively, through which the fingers such as 137 extend and in which said fingers are adjustably clamped as by set screws such as 148 (FIG. 7). Cap members 146 and 147 are secured to the top of their respective finger support portions 143 and 144 by bolts 151 and 152, respectively.

Crank member 139 further includes a downwardly extending crank arm 153 which extends therefrom at substantially 90° and is of such a length that its lower end 153*a* is disposed adjacent the end of rockshaft 66 as shown in FIG. 8. A bolt or screw 154 is screwed through cooperating threads provided in end 153*a* of crank arm 153 and is adjustably locked therein by a lock nut 156. The end of screw 154 opposite that on which lock nut 156 is provided is located substantially in alignment with and adjacent to end 95 of rod 93 previously discussed. As is readily apparent when end 95 of rod 93 contacts the end of screw 154 it may be further pressed thereagainst to cause rotative movement of crank member 139 about its point of pivotal connection to rocker arm 51. Such movement of crank member 139 will impart a similar movement to crank member 138 due to crank arms 141 and 142 being pivoted to each other at the otherwise free ends of such arms. At such time crank member 138 moves, of course, about its point of pivotal connection to rocker arm 51.

A tensional spring 157 (FIG. 8) is connected at first and second ends thereof to finger support portions 143 and 144 of crank members 138 and 139, respectively. Spring 157 is normally under tension and, therefore when end 95 of rod 93 does not contact the end of screw 154, portions 143 and 144 of crank members 138 and 139 are urged or biased toward each other as shown in FIG. 8, and crank arms 141 and 142 are urged or biased downwardly as shown in such drawing figure. When, however, end 95 of rod 93 contacts and presses against the end of screw 154, as previously discussed, crank arm 153 is urged in the left hand direction (viewing FIG. 8) and finger support portions 143 and 144 and their associated cap members are moved away from each other against the tensional force of spring 157. Fingers such as 137 are, at such time, also moved away from each other and the rim of an article or lens such as 21 disposed on platform 136 at such time. When, of course, the force against the end of screw 154 is again removed, the apparatus just described, and including fingers such as 137, reverts under the tensional bias of spring 157 to the positions shown in FIG. 8 of the drawings. Such operation will be briefly further discussed hereinafter.

It is expedient to point out at this time that the fingers, such as 137 can be adjusted to accommodate articles having diameters larger or smaller than lenses such as 21 shown in the drawings. That is to say, each article of any one succession of articles must be of the same diameter as each of the other articles of such succession but other successions of articles, each article of each respective succession having the same diameter as the other articles of such respective succession but differing in diameter from the articles of said one succession, may be handled on platform 136 by adjustment of the fingers, such as 137, further toward or away from each other. Such adjustment may be made by loosening set screws 148, and then moving said fingers in the direction desired and retightening the set screws.

Figure 9:
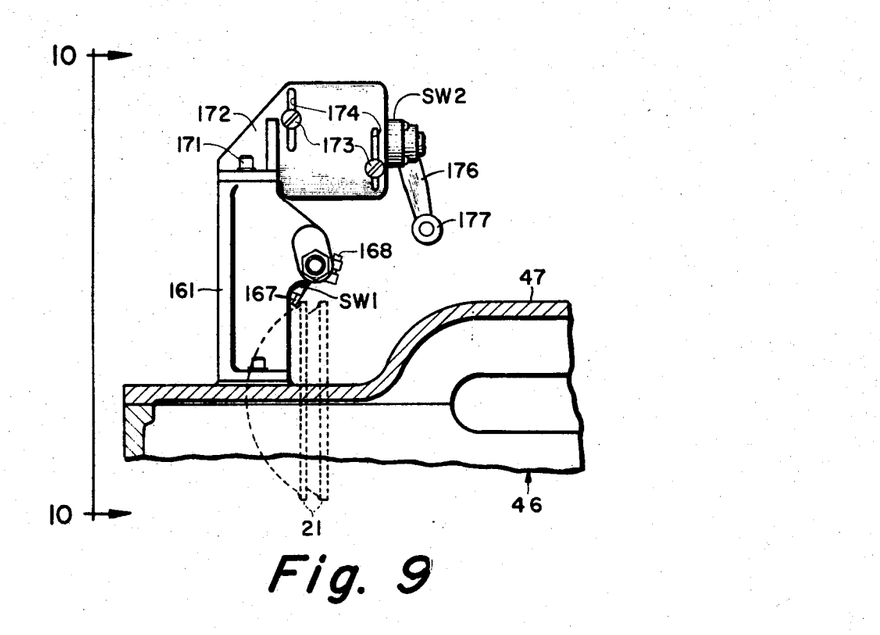
Figure 10:
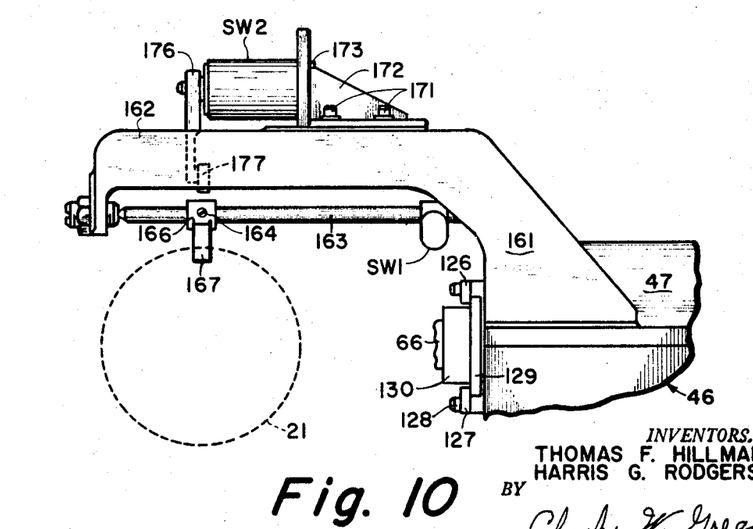

Referring to FIGS. 9 and 10, taken in conjunction with FIGS. 1 and 4, a support member 161 is mounted on top 47 of housing 46, such support member extending out from top 47 and above conveyor 33. For purpose of clarity of the general apparatus arrangement of FIG. 1, only a fragment of support member 161 is shown therein. However, from a brief study of FIGS. 9 and 10, it will be apparent that the lenses, such as 21, shown therein in dotted outline form are lenses which have already been loaded in a sheet of packaging material such as 41 (FIGS. 1 and 2). The general arrangement of the apparatus of FIGS. 9 and 10 relative to the apparatus of FIG. 1 will also become apparent from the following discussion.

There is pivotally mounted on the bottom of an extending arm portion 162 of support member 161 an axle or shaft 163 (FIG. 10) to which is secured as by a set screw 164 an article detector 166 having a downwardly extending portion 167. A first electrical switch SW1 is also secured to axle 163 as by a clamp arrangement including a clamping screw 168 (FIG. 9). Switch SW1 may, for example, be a mercury switch which may complete an electrical circuit therethrough when portion 167 of detector 166 is contacted by an article, such as a lens 21 as shown in FIGS. 9 and 10, and axle 163 is thereby rotated to tilt the switch as illustrated. If no article contacts portion 167 of detector 166, axle 163 rotates and portion 167 of detector 166 then extends vertically downward. Axle 163 is then in a position of rotation such that switch SW1 assumes a nontilted attitude so that an electrical circuit completed therethrough is interrupted. It is pointed out, however, that switch SW1 is of a type that requires the passage of a brief period of time before an electrical circuit previously completed therethrough is interrupted when the switch assumes a nontilted attitude. That is to say, switch SW1 is a fast-make and slow-break type of switch. Such switches are well known and the purpose of such switch will be discussed hereinafter in conjunction with FIG. 14 of the drawings.

There is mounted on the top of extending arm portion 162 of support member 161, by screws such as 171, a bracket 172 to which is adjustably fastened a second electrical switch SW2. Switch SW2 is adjustably secured to bracket 172 by screws 173 which extend through vertical slots 174 in such bracket. It is apparent, therefore, that the position of switch SW2 can be adjusted upwardly and downwardly by loosening screws 173 and moving them in slots 174, and then retightening such screws.

Switch SW2 includes an actuating arm 176 which pivotably carries on its lower end an article contacting roller 177. When switch SW2 is in its non-actuated position as illustrated in FIGS. 9 and 10, its electrical contacts are closed and an electrical circuit may be completed therethrough. When, however, roller 177 on the lower end of actuating arm 176 is contacted and moved by an article being loaded by the apparatus of the present invention, as hereinafter discussed, such arm is correspondingly moved and said electrical contacts become opened to interrupt an electrical circuit previously completed therethrough. The purpose of switch SW2 will be discussed hereinafter in conjunction with FIG. 15 of the drawings.

Figure 11:
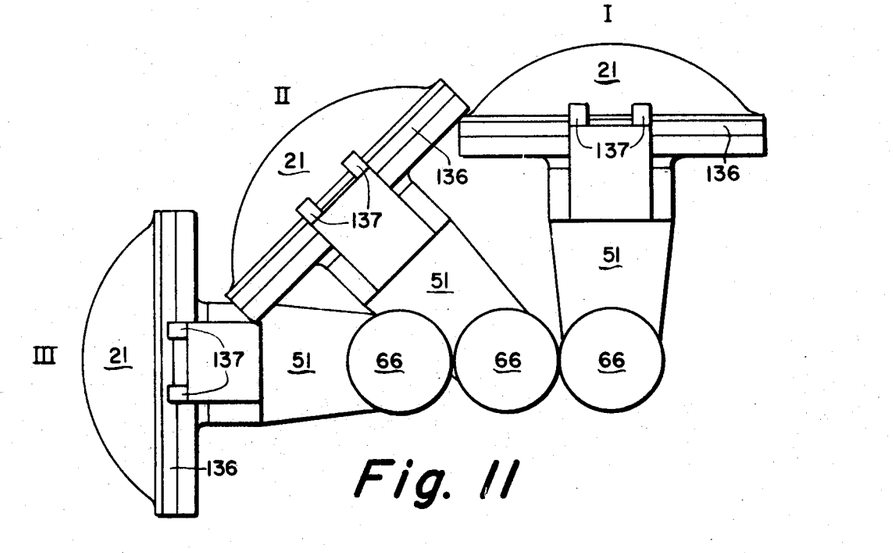
Figure 12:
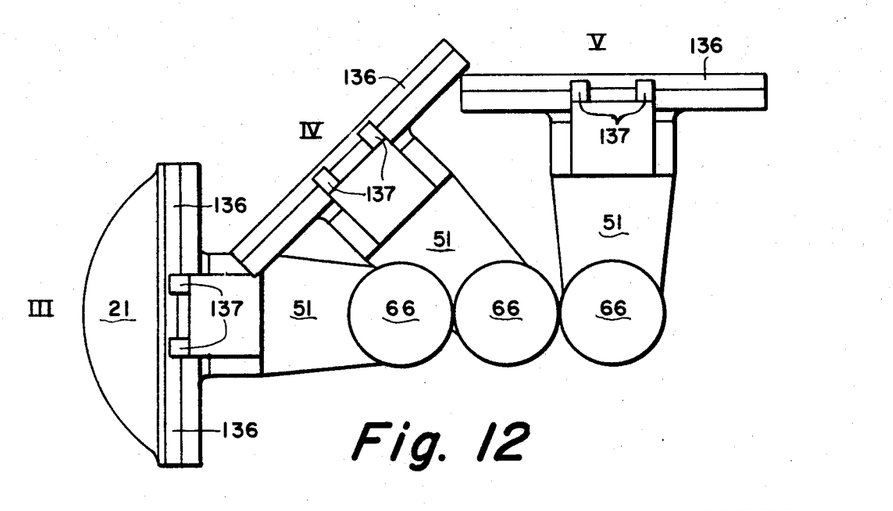

FIGS. 11 and 12 of the drawings, as previously mentioned, schematically illustrate movements or motion of part of the inventive apparatus disclosed herein. FIG. 11 illustrates said motion when the apparatus is loading an article into a sheet of packaging material and FIG. 12 illustrates said motion when the apparatus is returning to its original position following the loading of said article. For purposes of clarity of understanding the parts of the apparatus schematically illustrated in FIGS. 11 and 12 are indicated by the same reference characters as their counterparts in the other figures of the drawings.

Referring first to FIG. 11, and article, such a hollow domed lens 21, has just been delivered to and placed on the top surface of platform 136 as illustrated by the position indicated at I. Platform 136 is then moved through a vertical and rotational arc of travel while simultaneously moving linearly in the direction of such rotation. The midway position of such movement is indicated at II. Upon completion of said movement, platform 136 and lens 21, as well as the associated apparatus illustrated, occupies the positions shown at III. Lens 21 has now been inserted in a sheet of packaging material such as sheet 41 (FIGS. 1 and 2). It will be noted that the motion of the apparatus is such that the lens 21 at position II will not contact a previously loaded lens occupying position III but the dome of the succeeding lens will be inserted into the hollow of the dome of the preceding lens at position III without the outside surface of the first-mentioned dome contacting the inner surface of the preceding dome but, yet, closely spaced therefrom as shown in FIG. 2. This is due to the linear movement of the apparatus simultaneously with the rotational movement thereof. FIG. 12 illustrates the movement or motion of the apparatus upon returning from the position indicated at III through the intermediate position IV and to the original position indicated at V. Such movement is, of course, just the opposite or reverse to that of FIG. 11 and positions IV and V correspond to positions II and I, respectively, shown in FIG. 11. It is additionally pointed out that the linear motion of the apparatus during return of platform 136 to its original position assures that the upper edge of a lens, such as 21, loaded at position III will not be contacted, that is, struck or hit by platform 136 or its associated apparatus when such platform begins its movement to its original position V (I).

Figures 13, 14, 15:
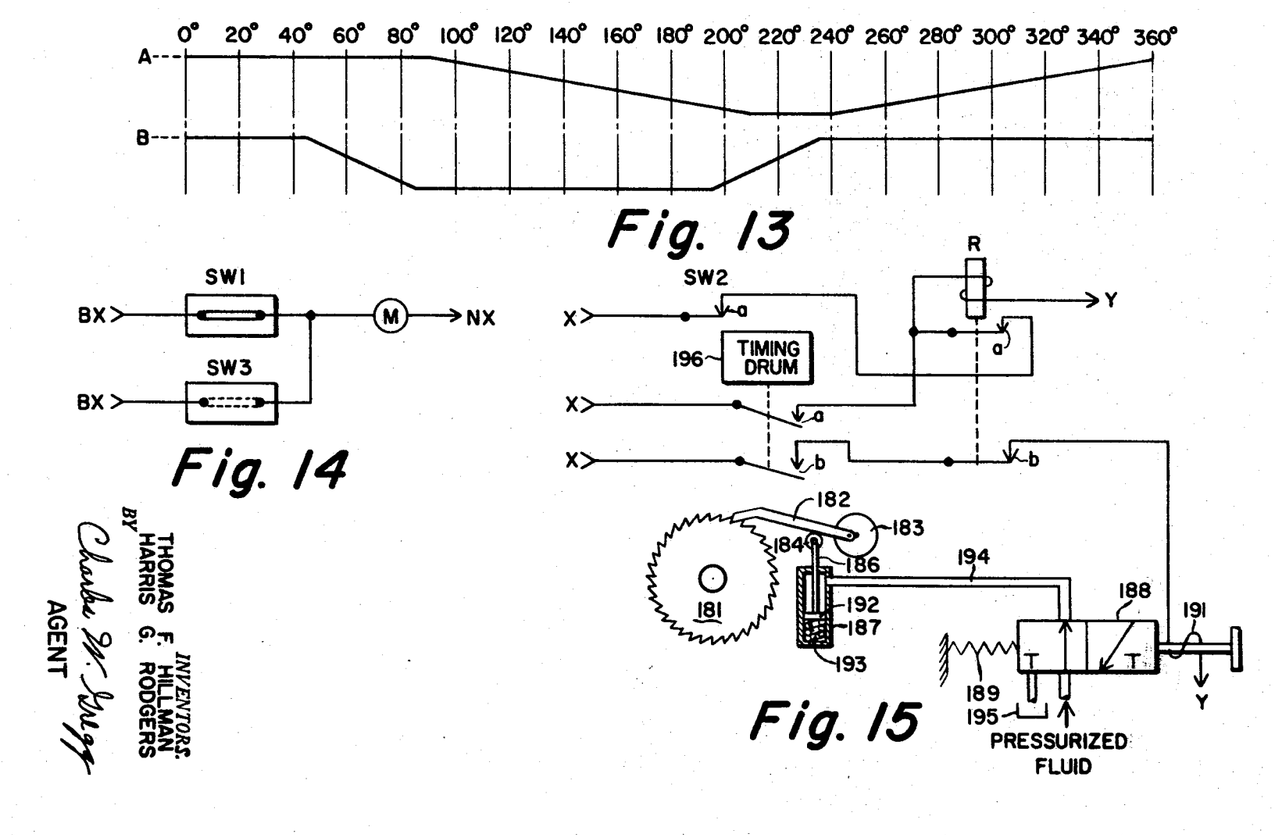

Referring to FIG. 13, the relationship between the rotation of drum cam 106 (FIG. 4) and face cam 111 (FIGS. 4 and 5) and the apparatus actuated by each cam will be briefly and generally discussed. It will be noted that the chart of FIG. 13 represents an expanse from 0° to 360° and, therefore, represents a full revolution of each of cams 106 and 111. The chart is graduated and marked in steps of 20° each and the 0° mark and 360° mark are to be considered the same mark, that is, the beginning and end of a complete revolution of said cams. Curve A on the chart, as discussed below, indicates the movement and dwell periods of platform 136 during one revolution of cam 106, and curve B on the chart indicates the movement and dwell periods of the fingers such as 137 during an identical revolution of cam 111. Thus the chart indicates the movements and dwell periods of said apparatus in relationship to each other.

It will be assumed that platform 136 has just returned to its position indicated at I in FIG. 11. At such point during one revolution of cams 106 and 111, such cams are, according to the chart of FIG. 13, at the 0° line and fingers 137 are retracted from the rim of platform 136 so that an article, such as a lens 21, can be placed on the top surface of the platform. Such article is so placed prior to the 45° point in the revolution of cam 111 because, at such point in the revolution of the cam, fingers 137 begin moving toward the rim of platform 136 as indicated by the starting point of the downward slope of curve B. At approximately the 80° point in the revolution of cams 106 and 111, fingers 137 complete their movement toward said rim (end of downward slope of curve B) to contact the rim or outer edge of a lens 21 supplied to platform 136 and hold the lens on the platform during movement of the latter. At approximately the 90° point in the revolution of cams 106 and 111, as indicated by the start of the downward slope of curve A, platform 136 starts its movement illustrated in FIG. 11. At approximately the 195° point of revolution of the cams, fingers 137 are starting to be retracted to begin to release the lens 21 (starting point of upward slope of curve B) while platform 136 continues its downward motion to firmly load the lens in the space between two adjacent rows of the bosses 42 on the sheet of packaging material 41 (FIG. 2). Fingers 137 are continued to be retracted until cams 106 and 111 have reached approximately the 235° point in their revolution (end of upward slope of curve B). At approximately the 240° point in the revolution of the cams, platform 136 starts its return to its original position. This is indicated by the beginning of the upward slope of curve A. As indicated by the end of the upward slope of curve A, the 360° point (0° point) in the revolution of cams 106 and 111 has been reached and one revolution thereof has been completed. The apparatus is ready to repeat the cycle of operations just described. Thus, the chart shown in FIG. 13 represents the patterns of the grooves 107 and 112 in cams 106 and 111, respectively.

In FIG. 14 there is shown an electric motor M which is the main drive motor for all the apparatus shown in FIG. 1 of the drawings, including platform or table 20, transfer arm 24, conveyor 33, and drive shaft 101 and, thus, the apparatus of the present invention. Motor M may be energized, for example, from a suitable source of alternating current having first and second terminals designated BX and NX, respectively. Such source is not shown in the drawings for purposes of simplification thereof.

As shown in FIG. 14, motor M has a first energizing circuit which extends from terminal BX of said current source through previously discussed mercury switch SW1 in its circuit completing condition and thence to one side or terminal of motor M. The other side or terminal of motor M is connected to terminal NX of said current source. It is apparent, therefore, that motor M is energized to drive its previously discussed associated apparatus whenever switch SW1 is tilted as shown in FIG. 9 of the drawings.

Motor M has a second energizing circuit which extends from terminal BX of said current source through switch SW3 (FIG. 14). Such switch may also be a mercury switch and, when the switch is manually actuated to complete a circuit therethrough, current from said terminal BX flows through the switch to said one side or terminal of motor M and thence through the motor to terminal NX of said current source. The purpose of switch SW3 is to energize motor M and start the operation of the apparatus. Such switch is kept in its circuit closing condition, following a manual actuation thereof, until an article such as 21 is loaded in the sheet of packaging material such as 41 and switch SW1 is thereby tilted (as shown in FIG. 9) to complete said first energizing circuit to motor M. Switch SW3 is then actuated to its open-circuit condition illustrated in FIG. 14.

Alternatively, if found desirable or expedient to do so, motor M may be connected, through a manually actuated master switch, across terminals BX and NX of said current source. Thus, as long as the master switch remains closed, motor M is energized and operating. Under such condition, motor M is mechanically connected to the apparatus through an electrically controlled clutch-brake assembly, and switches SW1 and SW3 are connected to such assembly rather than to motor M as shown in FIG. 14. Terminal NX is also connected to such assembly for energization thereof. The clutch of such assembly is engaged and the brake thereof is released so that motor M drives the apparatus, only when the assembly is energized from said source of current. Upon interruption of the supply of current to the assembly, the clutch thereof becomes disengaged and the brake is applied to stop the apparatus driven by motor M. In such an arrangement switch SW3 is manually actuated in the same manner as that previously described in conjunction with the energization of motor M, that is, such switch is manually actuated to its closed-circuit condition only to start operation of the apparatus and, following the completion of the circuit through switch SW1 to the assembly, switch SW3 is manually actuated to its open-circuit condition. Clutch-brake assemblies of the electrically actuated type and such as that discussed are well known in the art.

Referring now to FIG. 15, there is shown a ratchet wheel 181 having teeth engaged by a reciprocating click or pawl 182, such pawl being reciprocatively driven by a rotating wheel 183 connected, as previously mentioned through a suitable gear box to drive shaft 133 (FIG. 4).

Drive shaft 133 is driven, as previously mentioned, by a chain drive operated by a chain sprocket 132 driven by drive shaft 101 (FIG. 4). The right hand end of drive shaft 101 (viewing FIG. 4) is connected through a suitable gearing arrngement to previously discussed motor M (FIG. 14) and is rotatively driven by such motor in the direction indicated by the arrow adjacent said end of the drive shaft.

Pawl 182 rests upon a roller 184 pivotally carried on the upper end of a piston rod 186 of a pressurized fluid actuated piston 192 in a vertically disposed fluid cylinder 187. A fluid flow control valve 188 controls the supply of pressurized fluid to and from cylinder 187. Valve 188 is a two-position, three-way valve which is normally maintained in a first position by a compression spring 189 connected thereto. Such valve is an electrical solenoid valve which is actuated to its second position when the control winding 191 thereof is energized and is returned to its normal position by spring 189 when control winding 191 is again deenergized following a period of energization thereof.

Pressurized fluid from a suitable source thereof is normally supplied through valve 188 over a conduit 194 to cylinder 187, and normally maintains piston 192 adjacent the lower part of cylinder 187 and the associated piston rod 186 retracted within such cylinder. A spring 192, disposed in the extreme lower part of said cylinder, is normally maintained under compression by piston 192. When control winding 191 is energized, as hereinafter discussed, valve 188 is actuated to its second position and the pressurized fluid in cylinder 192 is vented over conduit 194 to a suitable fluid sink 195 or to atmosphere. Spring 193 then actuates piston 192 and piston rod 186 in an upward direction and pawl 182 is, thereby actuated out of engagement with the teeth of ratchet wheel 181. When control winding 191 later becomes de-energized, valve 188 is returned to its original position by spring 189 and pressurized fluid is again supplied over conduit 192 to cylinder 187 to again retract piston rod 186 and permit pawl 182 to again engage the teeth of ratchet wheel 181. The purpose of such arrangement is discussed hereinafter.

There is also shown in FIG. 15 a direct current relay R which may be energized over first and second energizing circuits extending from positive terminal X of a suitable source of direct current and through the winding of the relay to negative terminal Y of such source. For purposes of simplification of the drawings said source of direct current is not shown therein. Said first energizing circuit extends from said terminal X of said current source over a contact *a* of a timing drum or programmer designated 196 (when such contact is closed) to a first side of the control winding of relay R and through such winding to terminal Y of said source. The second energizing circuit for relay R is a holding circuit for such relay and extends from terminal X of said direct current source over the previously mentioned normally closed contact *a* of switch SW2 (FIGS. 9 and 10) and thence over a normally closed contact *a* of the relay to said first side of the control winding thereof. It is apparent, therefore, that once relay R becomes energized over contact *a* of timing drum 192 it is maintained energized over its own contact *a* so long as contact *a* of switch SW2 remains closed as shown in FIG. 15.

Control winding 191 of valve 188 is provided with an energizing circuit which extends from terminal X of said direct current source, over contact *b* of timing drum 196 (when such contact is closed) and thence over a contact *b* of relay R and through winding 191 to terminal Y of said direct current source. Thus winding 191 is energized whenever contact *b* of timing drum 196 closes and relay R is in its energized condition as shown and, therefore, has its contact *b* closed.

Programmers or timing drums such as 196 are well known and such drum is connected, for actuation thereof, through a suitable gearing arrangement to motor M or to apparatus driven by such motor. The gearing arrangement is chosen so as to drive timing drum 196 in a selected time relationship with the other apparatus and, therefore, contacts such as *a* and *b* of the drum are actuated to open and closed conditions in accordance with said selected time relationship. This will be further discussed hereinafter.

Having thus described the apparatus arrangement embodying the invention herein disclosed, a brief operational example of the invention will now be given.

It will be assumed that a sheet of packaging material such as 41 (FIGS. 1 and 2) is disposed on conveyor 33 in the proper position for receipt of a first one of the succession of articles, such as 21, to be loaded therein. It will also be assumed that such articles are continuously manually supplied to the article supports, such as 22, on rotatable table or platform 20 (FIG. 1). As previously mentioned, electrical switch SW3 (FIG. 14) is manually actuated to energize motor M and start the apparatus. Such energization of motor M starts the rotation of platform 20. Motor M also drives the remainder of the apparatus, through suitable gearing arrangements previously mentioned, in time relationships with the rotation of platform 20 such that, as a succession of articles such as 21 are intermittently delivered to transfer station A (FIG. 1) transfer arm 24 and vacuum chuck 26 are actuated to pick up each such article at station A and deliver the respective article to station B where it is placed on the top surface of platform 136. Rocker arm 51 is actuated by rockshaft 66 in a time relationship with the rotation of table 20 and the operation of transfer arm 24 such that it is always at station B to receive an article tranferred thereto by transfer arm 24. Rocker arm 51 is, of course, actuated to load each article so received in a sheet of packaging material, such as 41, and return to station B within the period of time it takes transfer arm 24 to place one article on platform 136 at station B, return to station A to pick up a succeeding article from table 20 and transfer such succeeding article to station B. The fingers such as 137 associated with platform 136 are actuated through cam 111 and its associated apparatus in the manner previously discussed, to hold on such platform, during the article loading operation performed by the platform, each article placed thereon and to be loaded in the sheet of packaging material 41. These operations of the apparatus are now believed to be readily apparent in the light of the previous description of the structure of the apparatus.

Referring further to FIG. 15, wheel 183 is rotated in a time relationship with the operation of the remainder of the apparatus such that pawl 182 is actuated to sequentially engage each succeeding tooth of ratchet wheel 181 and rotate or ratchet such ratchet wheel, immediately following the loading of each of said succession of articles in a sheet of packaging material, a distance corresponding to the spacing between each pair of adjoining teeth of the ratchet wheel. The spacing of such teeth corresponds to the spacing of the bosses such as 42 on a sheet of packaging material such as 41 (FIG. 2) and ratchet wheel 181 is connected to conveyor 33 to intermittently step such conveyor, each time the ratchet wheel is ratcheted, a distance corresponding to said spacing of said bosses and said spacing of said teeth. This will be readily apparent to those skilled in the art. However, the apparatus for providing the stepping of conveyor 33 forms, in itself, no part of the present invention except as hereinafter pointed out.

Following the starting of the apparatus by the manual actuation of switch SW3 (FIG. 14) a first article 21 is loaded in the sheet of packaging material such as 41 and, as illustrated in FIG. 9 and 10, contacts portion 167 of actuator 166 and tilts switch SW1. Motor M (FIG. 14) is then energized over its first energizing circuit previously discussed and switch SW3 is then manually actuated to open the circuit used to start motor M and initiate operation of the apparatus. As conveyor 33 is stepped, each succeeding article loaded in a sheet of packaging material actuates switch SW1 similarly to the manner illustrated in FIGS. 9 and 10 and, due to the previously mentioned slow operation of such switch, maintains the energizing circuit for motor M closed. If, however, it happens that an article is not properly positioned in the sheet of packaging material following each incremental movement of conveyor 33, switch SW1 is not tilted, due to the absence of a properly loaded article, and such switch moves to its nontilted position, motor M is thereby deenergized subsequent to the slow action feature of switch SW1 and all of the apparatus is thus brought to a stop. After correction for the faulty loading of said article, switch SW3 is manually actuated to again start the apparatus in the manner identically to that previously described.

As each article, such as 21, is carried by platform 136 toward the sheet of packaging material, such as 41, the top of such article contacts roller 177 on the lower end of actuating arm 176 of switch SW2 (FIG. 9) and actuates such switch to open its contact $a$ (FIG. 15) thereby deenergizing relay R. Relay R is thus momentarily actuated to open its contact $b$ in the energizing circuit for winding 191 of valve 188 so that no operation of such valve takes place when contact $b$ of timing drum 196 closes. Subsequent thereto contact $a$ of timing drum 196 momentarily closes to again energize relay R which then closes its contact $a$ and reestablishes its holding circuit over such contact.

Assuming now that, for some reason, no article was delivered to platform 136 previous to an article loading movement thereof, switch SW2 is not actuated during said loading movement and relay R is not, therefore, deenergized. Immediately prior to platform 136 reaching its full downward position during any actuation thereof, contact $b$ of timing drum 196 (FIG. 15) is actuated to its closed condition and remains so until after panel 182 has been moved to cause a ratcheting movement of ratchet wheel 181, such contact $b$ again opening at such time. Thus, if as assumed, no article is on platform 136 during said loading movement and relay R does not, therefore become released, when contact $b$ of timing drum 196 closes as stated, the circuit for energizing winding 191 of valve 188 is completed. Valve 188 is then actuated to release the pressurized fluid in cylinder 187 and piston rod 186 raises pawl 182 out of engagement with the teeth of ratchet wheel 181. Thus no stepping of conveyor 33 takes place at such time and the empty space in the sheet of packaging material remains in its place for receipt therein of the next article carried thereto by platform 136. By such operation of the apparatus, it is assured that a sheet of packaging material will not be only partially loaded, that is, will not be loaded with some empty loading spaces remaining therein.

It is pointed out that the opening of contact $b$ of timing drum 196, following the closing of such contact, must take place before the closing of contact $a$ of such timing drum. If such sequence of operation is not provided, that is, if contact $b$ of the timing drum remains closed during the previously mentioned closing of contact $a$ of such drum, when switch SW2 is actuated by an article being loaded and relay R is thus deenergized to open its contact $b$, upon contact $a$ of timing drum 196 again closing to reenergize relay R and the subsequent closing of contact $b$ of such relay, the energizing circuit for winding 191 of valve 188 will be energized and possibly prevent the stepping of conveyor 33. Thus the described sequence of operation of contacts $a$ and $b$ of timing drum 196 is provided.

The apparatus of the present invention is especially suitable for loading articles such as sealed beam headlight lenses in a sheet of packaging material of the type described since such lenses are often provided with a series of reference or orienting projections adjacent the outer rim thereof and must, therefore, be loaded in said sheet of packaging material with a selected rotational orientation of such lenses in order to prevent said projections thereon from interfering or colliding with the bosses, such as 42 on a packaging sheet such as 41. Such lenses can be supplied to article supports 22 on table or platform 20 with a preselected rotational orientation of the lenses and it will be assured that the lenses will be loaded in the sheet of packaging material with a rotational orientation corresponding to such preselected orientation, the latter orientation being selected so as to assure loading of the articles without said interference of collision with said bosses. Furthermore, the apparatus of the present invention provides for loading of articles of the class discussed with a more firm and positive action than did any known prior apparatus.

Although there is herein shown and described only one form of apparatus embodying the invention, such is not intended to be in any way limiting but it is to be understood that various changes and modifications may be made therein within the purview of the appended claims without departing from the spirit and scope thereof.

What is claimed is:
1. In combination with an apparatus including,
   (I) means for intermittently delivering each of a succession of flat or relatively shallow dish-like articles having similar rims to an article transfer station;
   (II) means for transferring each said article from said transfer station to an article delivery station following the delivery of each such article to the transfer station;
   (III) a sheet of flexible material for packaging said articles, such sheet being provided with a plurality of rows of bosses which are also arranged in columns, the spaces between successive rows of bosses being substantially equal to the thickness of said rims; and
   (IV) an endless conveyor horizontally supporting said sheet of material so that a portion of each sheet assumes a horizontal trough-like semicylindrical configuration having a transverse curvature configuration substantially corresponding to that of a portion of each of said rims and with some of the bosses of the sheet protruding therefrom towards the interior of said semicylindrical configuration for receipt in each said space between each pair of adjoining rows of such bosses of a portion of the rim of one of said articles, said conveyor being intermittently moved in a time relationship with said operation of said delivery and transfer means, each such intermittent movement equalizing a distance corresponding to the spacing of said bosses;
improved apparatus for receiving each said article transferred to said delivery station and loading the rim of each successive article in successive ones of said spaces between said bosses of said sheet of packaging material, such apparatus comprising;
   (A) packaging sheet loading means for receiving each said article when transferred to said delivery station and temporarily supporting the respective article with the rim thereof horizontally oriented, such means including a platform movable through an approximately 90° arcuate vertical path of travel and simultaneously with such movement through a linear path of travel corresponding in direction to said arc of travel to load each respective successive article received by said platform with a portion of the rims of successive articles in successive spaces between said rows of bosses of said sheet of packaging material, each said article being so loaded with the rim thereof substantially vertically oriented;
   (B) means actuated following receipt of each said article by said platform for moving such platform through said paths of travel and then returning it to its article receiving position; and
   (C) means actuated following receipt of each said article by said platform for holding such article to said platform during said movement thereof from said delivery station through said paths of travel and releasing each respective article following its loading into said sheet of packaging material.

2. Apparatus in accordance with claim 1 and in which said platform is carried on the otherwise free end of a rocker arm and said means for moving said platform through said paths of travel is a rockshaft affixed to the other end of said rocker arm.

3. Apparatus in accordance with claim 1 and further including operable disabling means for terminating the operation of all of said apparatus following a loading movement of said loading means without the article then carried by the loading means being properly oriented in said sheet of packaging material, said disabling means being operated subsequent to the next intermittent movement of said conveyor.

4. Apparatus in accordance with claim 2 and further including operable disabling means for terminating the operation of all of said apparatus following a loading movement of said loading means without the article then carried by the loading means being properly oriented in said sheet of packaging material, said disabling means being operated subsequent to the next intermittent movement of said conveyor.

5. Apparatus in accordance with claim 1 and further including operable disabling means for terminating the operation of all of said apparatus, such disabling means being operated in response to an intermittent movement of said conveyor following a movement of said loading means without one of said articles being properly oriented in said sheet of packaging material.

6. Apparatus in accordance with claim 2 and further including operable disabling means for terminating the operation of all of said apparatus, such disabling means being operated in response to an intermittent movement of said conveyor following a movement of said loading means without one of said articles being properly oriented in said sheet of packaging material.

7. Apparatus in accordance with claim 1 and further including means operated to interrupt the next intermittent movement of said conveyor when said loading means moves through said paths of travel without carrying therewith one of said articles.

8. Apparatus in accordance with claim 2 and further including means operating to interrupt the next intermittent movement of said conveyor when said loading means moves through said paths of travel without carrying therewith one of said articles.

9. In combination with a sheet of flexible material for packaging a plurality of flat or relatively shallow dishlike articles having similar rims, said sheet of material being horizontally disposed and supported so that a portion of such sheet assumes a horizontal trough-like semicylindrical configuration having a transverse curvature configuration substantially similar to that of a portion of each said rims, said sheet of material also being provided with a plurality of rows of bosses which are also arranged in columns, such bosses protruding from said sheet towards the interior of said semicylindrical configuration and the space between successive rows of bosses being substantially equal to the thickness of said rims; apparatus for successively inserting between successive rows of said bosses a portion of the rim of each of a succession of identical ones of said articles, such apparatus comprising;

(A) a rocker arm keyed to a horizontally disposed rockshaft and normally extending upwardly from such rockshaft;

(B) a platform having a perimeter at least partially corresponding to that of the rims of said articles, such platform being immovably secured to the free end of said rocker arm so that it is normally horizontally disposed for receipt thereon of each one of said articles with the rim of each such article substantially coinciding with at least part of said perimeter;

(C) a plurality of movable fingers mounted adjacent said perimeter of said platform, such fingers normally clearing such perimeter and movable at selected times to contact the rim of each of said articles separately received on said platform to identically further position each such article thereon and temporarily hold the article in such position;

(D) rockshaft actuating means connected to said rockshaft for oscillatory and, simultaneously linear actuation thereof so as to provide oscillatory movement of said platform in a vertical arc of travel extending between its normal horizontal position and a vertical position while simultaneously moving said platform in linear directions corresponding to each respective direction of oscillatory movement of such platform;

(E) article placing means for intermittently placing each succeeding article of said succession of articles on said platform with the rim of each such article substantially coinciding with the perimeter of such platform;

(F) means operated, in a time relationship with said article placing means, to provide said actuation of said rockshaft actuating means and to actuate said fingers to further position each article received on said platform and hold said article on such platform only during movement of the platform from its normal horizontal article receiving position to its said vertical position; and (G) conveyor means for intermittent advancement of said sheet of material along a path of travel extending in the direction of said lateral movement of said platform in its movement from its said normal position to its said vertical position, such advancement of said sheet of material also being in the direction of the longitudinal axis of said trough-like configuration and in incremental steps each corresponding to said spaces between successive rows of said bosses on said sheet, each such incremental step of advancement occurring in a time relationship with the placement of each of said succession of articles upon said platform so that a portion of the rim of each successive article of said succession of articles is inserted by said apparatus in the spaces between those bosses of each succeeding row of said bosses located in said transverse curvature configuration of said sheet of material.

10. Apparatus in accordance with claim 9, and in which the placement of each of said succession of articles on said platform is performed with an identical preselected rotational orientation of each said article and each such article is transferred by said platform to said sheet of material in a corresponding identical rotational orientation.

11. Apparatus in accordance with claim 9 and in which at least one of said plurality of fingers is supported on the free end of a first arm of a first bell crank and at least another one of said plurality of fingers is supported on the free end of a first arm of a second bell crank, the fulcrums of such first and second bell cranks being pivotally mounted on said rocker arm below said platform with said free ends of said first arms extending above such platform adjacent points on said perimeter thereof substantially diametrically opposite each other across the platform and with the second arms of said bell cranks extending horizontally toward each other below the platform, the otherwise free ends of such second arms being pivotally connected to each other below said platform so that movement of one of said first arms causes an equal and opposite movement of the other said first arms and opposite ones of said fingers are thereby correspondingly moved into and out of contact with the rim of each of said articles separately received on said platform.

12. Apparatus in accordance with claim 11 and further including means connected between said first arms for resiliently biasing the free ends of such arms and their respectively associated fingers toward each other and toward the perimeter of said platform.

13. Apparatus in accordance with claim 12 and further including means for normally maintaining said free end of one of said second arms actuated upwardly against the force of said biasing means, and thereby, the free ends of said first arms and their respectively associated fingers actuated away from each other and away from the perimeter of said platform.

References Cited

FOREIGN PATENTS 890,102   2/1962   Great Britain.

RICHARD E. AEGERTER, *Primary Examiner.*